June 13, 1939.   J. A. VICTOREEN   2,162,412
POTENTIAL MEASURING APPARATUS
Filed Aug. 15, 1936
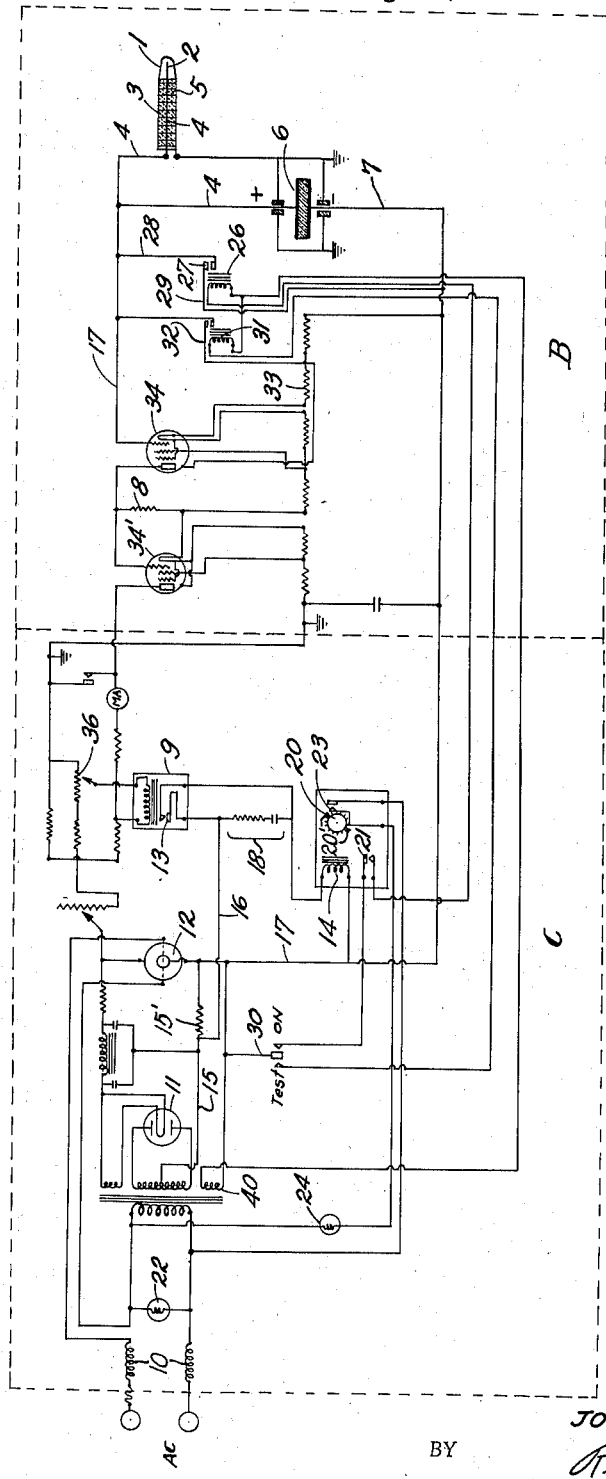
INVENTOR.
JOHN A. VICTOREEN
BY
ATTORNEYS Patented June 13, 1939

2,162,412

UNITED STATES PATENT OFFICE 2,162,412

POTENTIAL MEASURING APPARATUS

John A. Victoreen, South Euclid, Ohio

Application August 15, 1936, Serial No. 96,223

7 Claims. (Cl. 250—83)

This invention relates to improved apparatus for measuring electric currents or charges, and more particularly to a device adapted for accurately measuring the emission of rays such as Roentgen rays or the like.

In Roentgen ray apparatus the practice heretofore most commonly used for determining the amount of dosage or the quantity of rays produced was to merely start the apparatus into operation and operate it for a predetermined time, at the end of which period a certain quantity of rays were supposed to have emanated. This method of measurement was, however, known to be inaccurate, since the quality or intensity of the rays produced during a period of time may vary. That is without the operator being aware of the fact the same machine might produce rays having a more intense quality at one time than at another time, with the result that with this method the amount of rays produced might not be the desired amount.

Among the proposed methods of measuring the intensity of rays, a chamber containing a predetermined volume of gas and containing electrodes is placed in the path of the rays causing the gas to be ionized. The ionization of the gas is used to charge or discharge a condenser. Heretofore many of the instruments for determining the amount of charge of the condenser varied in their measurement and were nearly as ineffective for accurate measurement as the previously described time method.

In the present invention I have provided a device which is accurate to such a high degree that such small discrepancies as do occur are so extremely small as to be of no consequence.

The operation of the device is based upon the theory that when an electrical field is impressed between two electrodes, which electrodes are surrounded by a gas such as air, the gas is ionized, with the result that positive and negative ions or electrons move in opposite directions, both contributing to the current. The saturation value of the current depends upon the strength of the ionizing agent (in this instance Roentgen rays) and is directly proportioned to the column of gas between the electrodes and to the pressure of the gas.

Briefly, the invention includes an ionization chamber of predetermined volume adapted to be placed in the path of the rays to be measured and which is connected to a condenser of known capacity. The condenser is connected into the grid circuit of a vacuum tube. The rays ionize the gas in the chamber which charges the condenser, which places a positive grid potential on the tube and causes a gradual change in the plate current. The output of this tube is conductively connected to the grid circuit of a second vacuum tube, the output to which is adapted to operate an indicator such as a micro-relay which actuates a counter upon the current in the plate circuit, reaching a certain predetermined value. The counter having registered the amount, discharges the condenser, and starts the cycle anew. Obviously the micro-relay can be replaced by other types of indicators. The constants of the ionization chamber and the condenser are capable of accurate determination and hence the amount of charge held by the condenser may be accurately determined.

I have also provided accurate means for checking the calibration of the circuit and to permit the same to be quickly corrected for certain changes of constants within the circuit, and have so designed the circuit that the output of the last tube may be in direct ratio to the output or change in potential of the ionization circuit. Furthermore, although the apparatus illustrated is particularly adapted to measure Roentgen rays, it may, with but slight and obvious modification, be used to measure other types of emanation, such as ultra violet, etc.

Still other features of the invention which I believe to be a decided improvement over the prior art, will appear from the following description, which description is illustrated by the accompanying diagram.

In the diagram there is shown a closed ionization chamber 1, made of a material having an effective atomic number approximating that of air, into which extends an electrode 2. The chamber is secured to the end of a metal tube 3 through which a conductor 4 extends, the conductor being insulated from the tube by amber beads 5.

The size of the ionization chamber is accurately predetermined in the laboratory, by making the chamber longer or shorter. The chamber being on the end of the tube 3, which may be of varying length, a convenient method is provided of inserting the chamber in the path of the rays, which may be placed on, in or beside the article or patient being treated to measure constantly the ray emission during treatment.

The electrode of the ionization chamber is connected to one plate of a condenser 6 of a certain predetermined capacity by the conductor 4. The other terminal of the condenser is connected to the negative side 7 of a voltage supply of a constant potential. The casing or shield around the condenser is grounded and the casing of the tube 3 is connected directly to the source of positive potential through the ground.

The power supply may be taken from the line A. C. there being suitable radio frequency chokes 10 interposed in the line. The A. C. current is rectified through the usual rectifier circuit including the tube 11. The output of the power supply is controlled by a voltage regulator tube 12 which maintains a substantially constant voltage. Any residual line fluctuations are taken care of by the manner of operating the tubes in the electrometer circuit, hereinafter described.

A signal light 22 is shunted across the primary of the power transformer, indicating when the device is turned on.

Ionization of the gas in the chamber 1 causes a migration of the positive ions in the chamber in one direction, and the negative electrons in the chamber in the other direction, gradually charging the insulated plate of the condenser more positive until a certain predetermined voltage difference between the plates is reached. In this instance it has been found desirable to charge the condenser until a potential difference of two volts is found across the plates. This increase in the potential difference is impressed on the otherwise free control grid of the tube 34 through the connector 17. The tube is preferably a variable mu tube and in this instance may be operated with such potential as to reduce grid currents to a minium; for instance the plate potential may be below 14 volts which is below the ionization point of most gases. The increase in the grid voltage and the consequent increase in plate current, causes a potential difference to occur across the plate load resistance 8, which voltage drop is supplied to the control grid of the second tube 34'; the resistance 8 being in grid circuit of that tube. This increases the negative bias on the control grid of the second tube which reduces the existing plate current of that tube as the negative grid bias increases.

The tubes 34 and 34' are carefully matched within reasonable limits to obtain tubes having as nearly the same characteristics as reasonably possible. It should be noted at this point that because of the conductive coupling the tubes operate 180° out of phase; and since the plate current in the first tube is rising, that in the second is descending simultaneously, and inasmuch as these two tubes are operating on the asymptotic end of the characteristic plate current curves because of the low voltages used, they operate to cause the out-put of the second tube to be in inverse proportion to the input of the first tube.

The reduction in the plate current of the tube 34' causes the micro-relay 9 to operate. I therefore have a condition where the micro-relay operates after a predetermined potential difference occurs across the condenser 6; that is, when a potential difference of exactly 2 volts occurs across the condenser 6, the relay 9 is so adjusted that the contacts 13 close, closing the circuit to a relay 14.

Current for the operation of the relay 14 is obtained by the voltage drop across the resistance in the line 15 ahead of the regulator tube 12. The conductors 16 and 17 carrying the current therefrom to the relay 14 are controlled by the contacts 13 of the micro-relay 9. Obtaining the current in this manner ahead of the voltage regulator tube, provides an effective means for obtaining a D. C. source of potential, and being ahead of the regulator tube, prevents the sudden current drains due to the actuation of the relay from affecting the current and voltages of the remainder of the circuit beyond the regulator tube. A spark suppressor 18 is shunted across the contacts 13 for obvious reasons.

It will be apparent that, although the circuit shown is designed to operate so that the first tube 34 functions on a rising plate current, and the second tube 34' operates on a descending plate current, this could be readily reversed by causing the grid voltage on the first tube to become more negative, and the plate current would therefore become less, decreasing the grid bias on the second tube, to increase the plate current therein, instead of decreasing the plate current. In this event the relay 9 would be adjusted to operate upon an increase in plate current instead of a decrease in plate current.

Operation of the relay 14 also actuates the counter 20 which registers the cycle, which thus indicates that a certain predetermined voltage has been built up in the condenser 6; which in this instance corresponds to the amount of Roentgen rays emitted. This amount may be 5 Roentgen units and of course may be varied to indicate other amounts if desirable.

The counter is also adapted to close the contacts 23 to light a signal light 24, after a certain predetermined number of cycles have been recorded. This point may be varied at the will of the operator by properly adjusting the counter; that is the counter 20 may be rotated manually to any predetermined position so that a predetermined number of cycles occur prior to the closing of the contacts 23 by the arms 29' of the counter. These same contacts may also be used to shut off the source of radiation after a predetermined amount of emission has been obtained. The contacts 23 and the circuit including the light 24 may be used to operate a circuit breaker in the primary circuit to the X-ray machine, not shown, to open that circuit and thus shut off the machine.

Operation of the relay 14 also closes the contacts 21, energizing the relay 26, which closes the contacts 27 to short circuit the plates of the condenser 6 through leads 28 and 29, discharging the same. This drop in potential difference across the condenser 6 obviously removes the positive voltage from the grid of the first tube whose plate current immediately drops, permitting the grid of the second tube to return to its original negative bias, causing the plate current rise, and returning the micro-relay 9 to its original position. Current for operation of the relay 26 is obtained from the secondary winding 40 of the power transformer, the switch 30 being thrown to the "on" position.

Continuous emission of the rays through the ionization chamber causes further ionization to take place and the cycle of operation is repeated, each cycle being registered in a like manner on the counter 20 until the desired dosage is obtained.

I have provided accurate means for testing the circuit to assure its operation on exactly the desired potential difference being applied to the condenser, and which also permits adjustments within the circuit to be quickly made to compensate for such variations as may occur, which would otherwise tend to cause inaccuracies. At 30 I have shown a single-pole double-throw switch which, when in the "on" position, being the position at which the device is ready for operation, provides current from the secondary 40 of the power transformer to the relay contacts 21, and which, when thrown to the test position, closes the circuit to a relay 31, causing the contacts 32 to be closed, and introducing in the grid conductor 17 a potential of two volts obtained by the voltage drop across the resistor 33 in the grid filament circuit of the first tube.

Application of two volts to the grid of the first tube causes the mechanism to operate in a manner similar to that just described. Should the micro-relay fail to operate on the application of this voltage due to changes in constants within the circuit, the variabe resistance 36 may be changed to vary the current through the relay to the point where it just operates, thus assuring the operator that the device is adjusted to operate when a potential difference of two volts as applied to the grid of the first tube. This provides an instantaneous and an accurate means to check the device and permits adjustment of the device to a predetermined standard without the use of external apparatus. Heretofore the manner of checking the operation of other devices was obtained by insertion of the ionization tubes in a uranium chamber and manually timing the operation. Even then, after checking, it was necessary to resort to mathematical calculations to determine the out-put. These prior tests took considerable time and patience as well as skill on the part of the operator.

Operating the tubes of the electrometer circuit 180° out of phase and maintaining the voltages at such a low potential as to cause the plate current to occur on the asymptotic end of the curve, produces a substantially linear out-put for the second tube. The filaments, plates and grids being operated from the same source of voltage supply, and in series, also causes the residual variations to vary proportionately throughout, thus not affecting the operation.

In actual construction of the device the circuit components within the dotted lines B, which may be considered as the electrometer circuit, are placed close to the field of the ray emanation, and the remainder of the circuit enclosed by the dotted lines C and furnishing the power and recording mechanism, is separated therefrom, the six conductors shown being disposed in a suitably constructed cable, and placed in a separate position from the electrometer circuit, usually in another room. The casing enclosing the electrometer circuits is suitably shielded, and the remote placing of the power and recording mechanism, as well as the control switches, provides a remote control for the apparatus.

I claim:

1. In a device of the class described, a calibrated ionization circuit having an input and an output and including an ionization chamber, a source of potential, and a condenser, said condenser adapted to be charged by the source of potential upon ionization in said ionization chamber, an electrometer having an input circuit and an output circuit and a recorder, said calibrated circuit having its output connected to the electrometer, said electrometer having its output connected to the recorder, and said recorder adapted to record a predetermined charge in said condenser, and discharge the condenser after recording said charge.

2. In a device of the class described, an ionization chamber having electrodes, a condenser connected to the ionization chamber and adapted to be charged by ionization occurring in said ionization chamber, an electrometer including a pair of vacuum tubes conductively coupled to each other, said condenser being connected into the input of the electrometer, a power supply including a voltage regulator tube to maintain the output at a constant voltage, a counter connected to the output of the electrometer and including a micro-relay operable upon a predetermined current flow to actuate said counter and simultaneously discharge said condenser.

3. In a device of the class described, an ionization chamber having electrodes, a condenser connected to the ionization chamber, an electrometer including a pair of vacuum tubes conductively coupled to each other, said condenser being connected into the input of the electrometer, a power supply including a voltage regulator tube to maintain the output at a constant voltage, a counter connected to the output of the electrometer and including a micro-relay operable upon a predetermined current flow to actuate said counter and simultaneously discharge said condenser, and manual operated means to charge the plates of said condenser to a predetermined potential difference to permit adjustment of the micro-relay for operation at said potential difference.

4. In a device of the class described, an ionization circuit including an ionization chamber and a capacitor, an electrometer amplifier circuit including a pair of conductively coupled amplifying tubes, said ionization circuit being connected to the electrometer circuit, an indicator circuit including a bridge circuit and a calibrated output meter connected therein as a null indicator, the output of said amplifier forming one side of the bridge, manually adjustable means for changing the indication of said meter and means to indicate when the proper adjustment is reached.

5. In a device of the class described, a calibrated circuit including a condenser having an ionization chamber connected thereto, said ionization chamber adapted for insertion in a field of rays to ionize the gas therein and charge said condenser, an electrometer and amplifier circuit comprising a pair of tubes conductively coupled to each other, the input of the electrometer being connected to said condenser, a micro-relay connected to the output of said amplifier and a counter, said relay being operable upon charging of the condenser to a predetermined potential to actuate the counter and to discharge said condenser to reset the device, a source of constant potential for energizing said device and adapted to supply an exact potential for replacement of said calibrated circuit for testing and adjusting said device for operation.

6. In an apparatus of the class described including an ionization circuit comprising an ionization chamber and a capacitance, said capacitance adapted to be charged to a predetermined potential, an electrometer circuit including a vacuum tube having its input connected to the ionization circuit and its output to a recording circuit and arranged to operate the recording circuit at a predetermined positive potential in the ionization circuit, said recording circuit comprising a micro-relay and a counter and a discharging relay operable by the counter, a power circuit for furnishing operating current for each of said circuits.

7. In an apparatus of the class described including a calibrated ionization circuit comprising an ionization chamber and a capacitance, an electrometer circuit including a vacuum tube having its input connected to the calibrated circuit and its output to a recording circuit, said recording circuit comprising a micro-relay and a counter and discharging relay operable thereby, a power circuit for furnishing operating current for each of said circuits, means to check the calibration of the apparatus and to correct for changes in values within the circuit including a source of known potential taken from within the power circuit, means to connect said source to the input of the electrometer circuit, and control means connected to the micro-relay to cause the micro-relay to operate within certain limits.

JOHN A. VICTOREEN.